No. 642,770. Patented Feb. 6, 1900.
C. F. WHALEY & P. P. BARTHOL.
BICYCLE PEDAL STIRRUP.
(Application filed Aug. 22, 1899.)
(No Model.) 2 Sheets—Sheet 2.
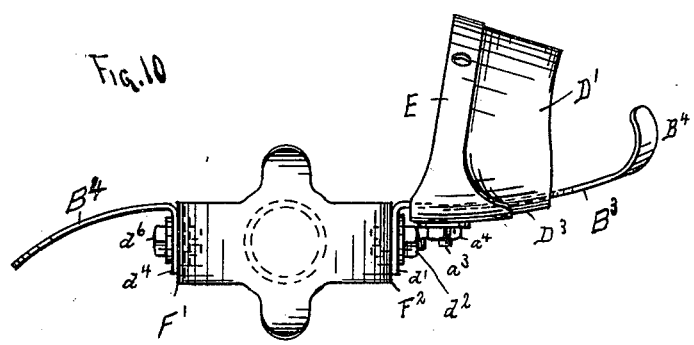
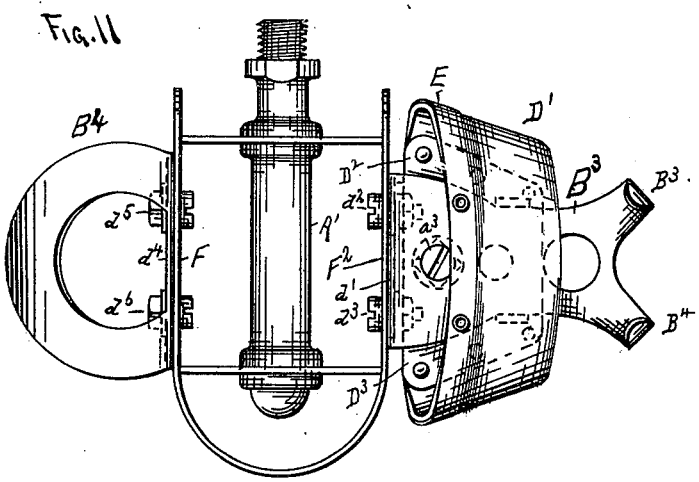
WITNESSES.
Frank Womack
J. W. Ramer
Charles F. Whaley
Paul P. Barthol.
INVENTORS,
By Charles N. Woodward, Atty.

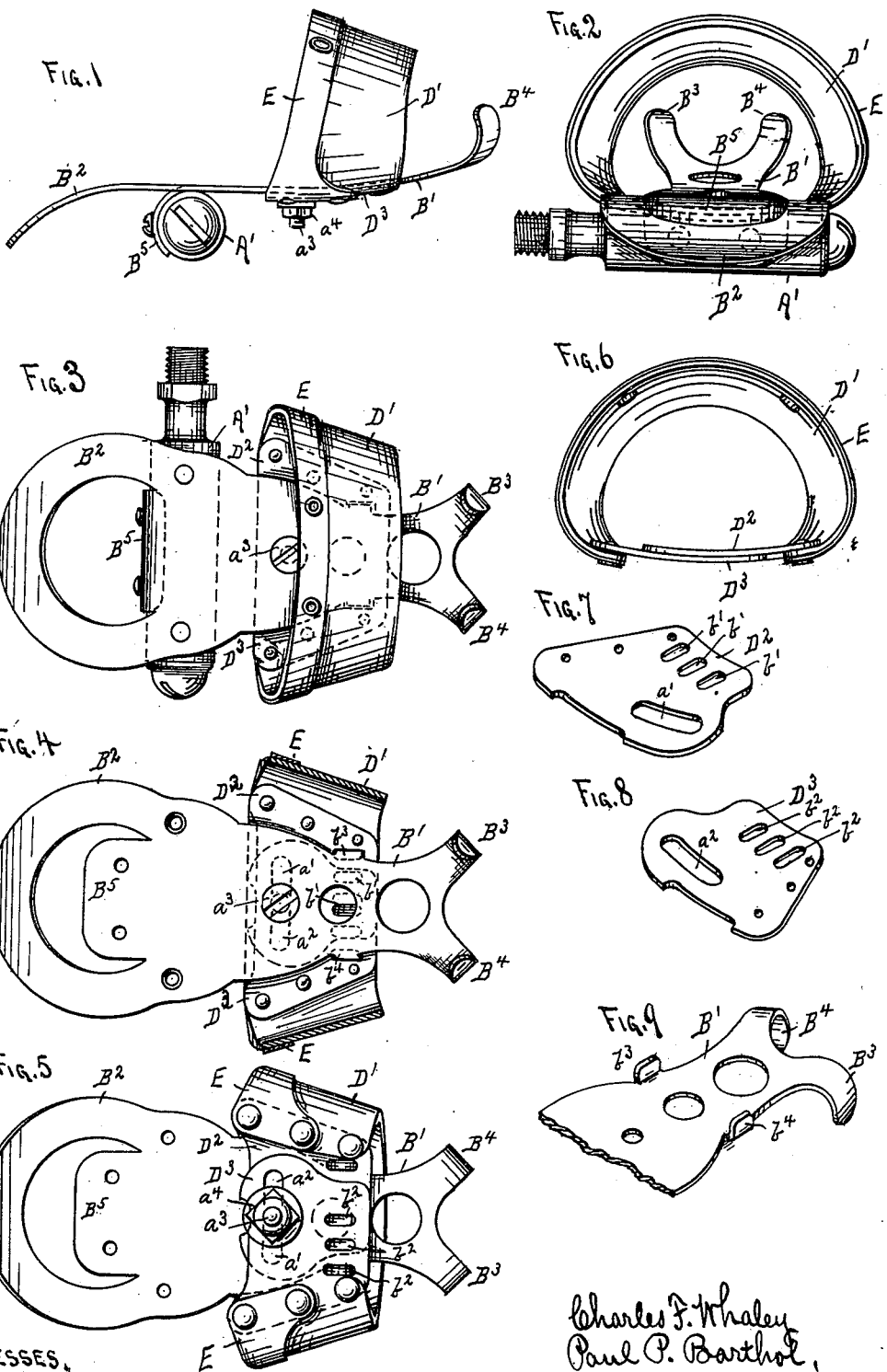

UNITED STATES PATENT OFFICE.

CHARLES F. WHALEY AND PAUL P. BARTHOL, OF ST. PAUL, MINNESOTA, ASSIGNORS TO THE WHALEY-DWYER COMPANY, OF SAME PLACE.

BICYCLE PEDAL-STIRRUP.

SPECIFICATION forming part of Letters Patent No. 642,770, dated February 6, 1900.

Application filed August 22, 1899. Serial No. 728,068. (No model.)

*To all whom it may concern:*

Be it known that we, CHARLES F. WHALEY and PAUL P. BARTHOL, citizens of the United States, residing in St. Paul, county of Ramsey, and State of Minnesota, have made certain new and useful Improvements in Bicycle-Stirrups, of which the following is a specification.

This invention relates to the toe-clips or stirrups used upon bicycles, tricycles, velocipedes, and similar vehicles to retain the foot of the rider upon the pedals; and it consists in the construction, combination, and arrangement of parts, as hereinafter shown and described, and specifically pointed out in the claims.

In the drawings illustrating the invention, Figure 1 is a side elevation, Fig. 2 is a rear elevation, and Fig. 3 is a plan view, of the device when used as a combined pedal plate and stirrup or toe-clip. Fig. 4 is a plan view of the pedal-plate and toe-guard detached, the toe-guard being in section. Fig. 5 is a bottom plan view of the parts shown in Fig. 4. Fig. 6 is a rear view of the toe-guard and its adjusting-plates detached. Figs. 7 and 8 are perspective views of the toe-guard-adjusting plates detached. Fig. 9 is a reversed perspective view of the forward part of the combined foot or base plate detached. Fig. 10 is a side view, and Fig. 11 is a plan view, illustrating a modification in the construction.

In using bicycles the rider finds it difficult to retain the feet upon the pedals when riding up grades or over small obstructions or rough ground, and to overcome this tendency various forms of devices have been designed, generally called "toe-clips" or "pedal-stirrups," and attached to the pedals to retain the feet of the rider in place at all times upon the pedals.

The present invention is a novel construction of such a toe-clip or pedal-stirrup, as will now be more specifically described.

Referring to the drawings, A' represents the central or main pedal-axle casing of a bicycle-pedal of the ordinary construction.

In Figs. 1, 2, and 3 the foot-plate of the "stirrup" is attached directly to this central pedal-axle casing, while in Figs. 11 and 12 the foot-plate is shown attached to the forward pedal-plate $B^2$ of the pedal-frame of an ordinary pedal. The foot-plate is thus adaptable to any form of bicycle-pedal or pedal-axle casing. In Figs. 1, 2, 3, 4, and 5 this foot-plate is formed of a forwardly-projecting portion B' and a rearwardly-projecting portion $B^2$, the forwardly-projecting portion formed with upwardly-curving toe-stops $B^3 B^4$ to check the forward movement of the foot. The rearwardly-projecting portion $B^2$ is preferably formed in circular shape, with the central portion cut out and leaving a "tongue" $B^5$, which, being bent downward, forms a means for connecting the plate to the casing A', as shown in Figs. 1, 2, and 3.

$D^2 D^3$ are two plates overlapping beneath the foot-plate B' and each provided with slots $a' a^2$, through which the binding-bolt $a^3$ passes, the bolt also passing through the foot-plate B' and secured by a nut $a^4$. By this means the plates $D^2 D^3$ may be adjusted laterally and secured at any desired point. The plates $D^2 D^3$ are curved, as shown in Figs. 2, 6, 7, and 8. Connected to the outer edges of the plates $D^2 D^3$ is a foot-guard, of leather or other suitable yielding material, formed to fit over the forward portion of the foot of the rider, and embracing the rear portion of the foot-guard is a metal band E, the ends of the band being secured to the rear outer edges of the plates $D^2 D^3$, preferably by the same rivets which secure the foot-guard D'. The band E will also be further secured by rivets to the rear edges of the toe-guard, as shown. By this arrangement the four parts B' $D^2 D^3$ E are firmly secured together, and the plates $D^2 D^3$, together with the attached foot-guard D' and its metal supporting-band E, rendered capable of lateral adjustment, as will be readily understood. Each of the plates $D^2 D^3$ is formed with a series of perforations or slots $b' b^2$, into which studs $b^3 b^4$ on the part B' fit as the plates are adjusted, to form a positive "locking" means between the plates $D' D^2$ and the part B'. Thus when the foot-guard is to be adjusted the bolt $a^3$ is loosened until the studs $b^3 b^4$ are released from the slots $b' b^2$, when the plates can be adjusted to a new connection between the slots and studs, when by tightening up upon the nut $a^4$ again the parts can be again clamped firmly together. Thus the width of the toe-guard can be readily increased or decreased to adapt it to any-sized foot.

The plates $D^2$ $D^3$ being curved, as before described, and connected by their outer edges by both the band E and the foot-guard $D'$, the foot-guard is thereby firmly supported, and no danger exists of the flexible guard sagging or "buckling" or wrinkling along the center when it becomes wet, as the leather toe-guards are liable to do when unsupported by the band E.

Another important advantage gained by the employment of the metal guard-band E is that the toe-guard at all times retains its shape, no matter to what extent it may be adjusted laterally, as the band E retains the leather toe-guard at all times in a symmetrical shape and is uniformly enlarged or contracted, and thus retains the shape of the foot no matter to what point adjusted.

The greatest weight being forward of the pedal-axle, the toe-guard end will hang downward when the pedal is not in use, and the rearward extension $B^2$ will then stand substantially upright and curving backward and affording means for tilting the pedal and its attached toe-guard into their proper horizontal position ready to receive the foot.

In Figs. 10 and 11 a slight modification in the construction is shown to adapt the device to an ordinary bicycle-pedal. In this arrangement $F'$ $F^2$ represent the forward and rear pedal-plates, respectively, of an ordinary pedal. In this modification the foot-plate is divided into parts transversely, the forward part $B^3$ having its rear edge $d'$ bent down and attached by bolts $d^2$ $d^3$ to the forward pedal-plate $F'$, and the rear part $B^4$ having its forward edge $d^4$ bent downward and attached by bolts $d^5$ $d^6$ to the rear pedal-plate $F^2$. By this means all the advantages of the shape of the form of the foot-plate shown in Figs. 1, 2, 3, 4, and 5 is retained, while at the same time utilizing the usual pedals of the bicycle. Thus in the construction shown in Figs. 1, 2, 3, 4, and 5 a combined pedal and toe-guard is produced, while in Figs. 10 and 11 a toe-guard and pedal extension are combined with an ordinary pedal.

Having thus described our invention, what we claim as new, and desire to secure by Letters Patent, is—

1. In a bicycle pedal-stirrup, a metal base or foot plate, two correspondingly-curved plates overlapping and attached adjustably to the base-plate, a foot-guard of leather or similar yielding material secured to the outer edges of said curved plates, and a continuous band of metal extending over and around the leather foot-guard at its outer edge so as to retain the arc curvature or symmetrical line at any desired adjustment, and attached by its lower ends to the lower edge of said foot-guard and also to the outer edges of said curved plates, substantially as and for the purpose set forth.

2. In a bicycle pedal-stirrup, a foot-plate secured to the pedal and provided with projecting lugs, a toe-guard formed of leather or similar material, metal plates secured to the adjacent edges of said toe-guard and overlapping and provided with slots, and a series of graduated perforations adapted to engage with the lugs on said foot-plate, and a bolt passing through said foot-plate and said slots in said toe-guard plates and provided with a nut, whereby the said toe-guard may be adjusted laterally and "locked" at any desired point of adjustment, substantially as set forth.

In testimony whereof we have hereunto set our hands in presence of two subscribing witnesses.

CHARLES F. WHALEY.
PAUL P. BARTHOL.

In presence of—
D. E. DWYER,
C. N. WOODWARD.